Jan. 19, 1937.   R. D. JESSUP   2,068,330
STRAND HANDLING APPARATUS
Filed Nov. 10, 1934
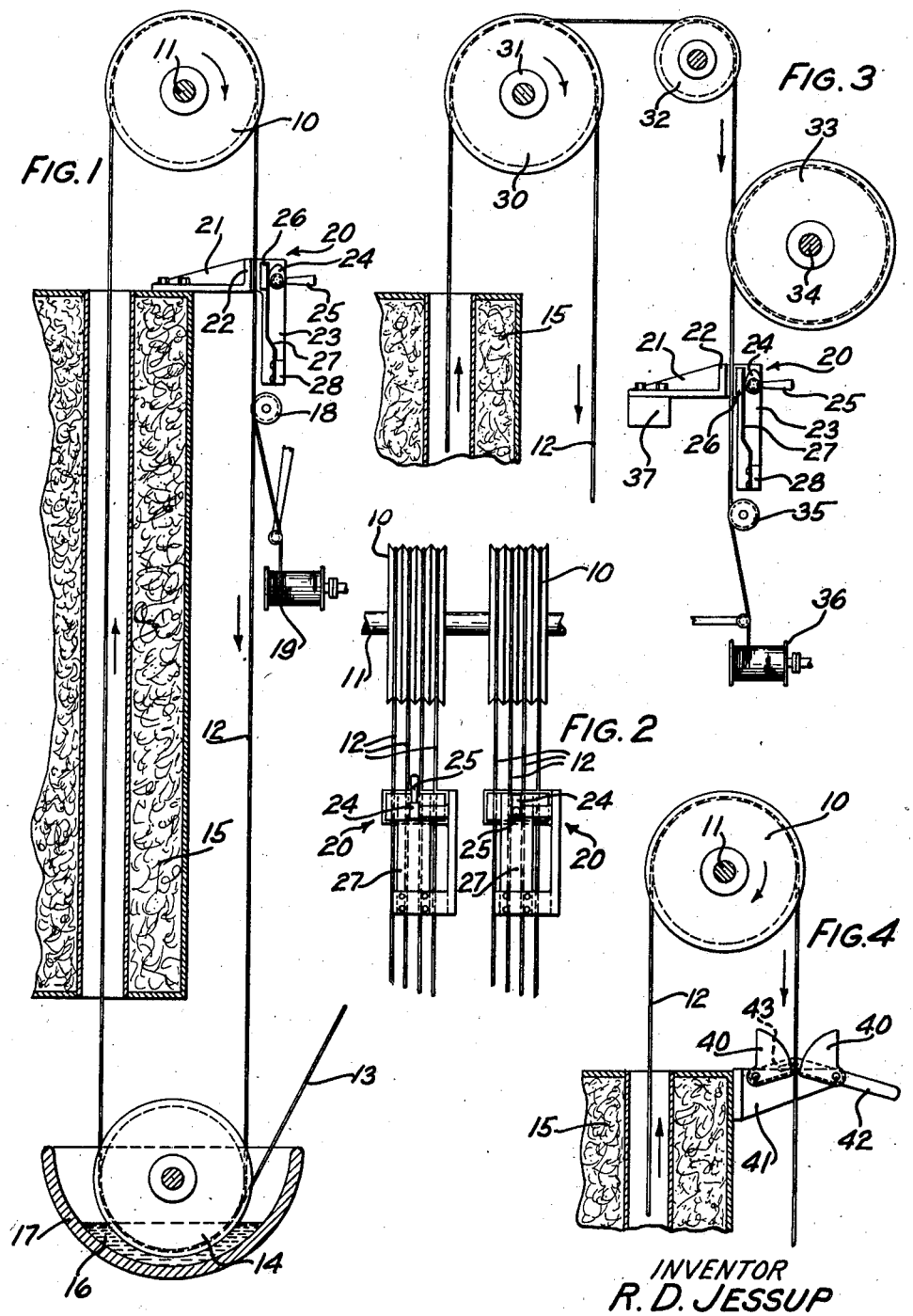
INVENTOR
R. D. JESSUP
BY H. A. Whitehorn
ATTORNEY Patented Jan. 19, 1937

2,068,330

UNITED STATES PATENT OFFICE 2,068,330

STRAND HANDLING APPARATUS

Richard D. Jessup, La Grange, Ill., assignor to Western Electric Company, Incorporated, New York, N. Y., a corporation of New York Application November 10, 1934, Serial No. 752,435

5 Claims. (Cl. 91—55)

This invention relates to a strand handling apparatus, and more particularly to an arrangement for selectively stopping the advancement of strand material.

In certain types of apparatus for coating strands with insulating material, each strand passes several times over a capstan, through a coating means around pulleys and through tubes in an oven where the several layers of coating material are baked upon the strands. An apparatus is shown in my Patent No. 1,782,425 of November 25, 1930, for coating a plurality of strands simultaneously with the use of a single oven, a clutch being provided for each capstan for the purpose of connecting the capstans to and disconnecting the capstans from the driving shaft when desired.

An object of the invention is to provide for interrupting the advancement of strands passing over a positively driven capstan without stopping the capstan.

In accordance with the object, one embodiment of the invention contemplates positively driven capstans closely positioned upon a drive shaft for advancing a plurality of wires a desired number of times through an enameling oven and clamps respectively positioned to engage the wires passing from the capstans for interrupting the movement of selected wires without stopping the other wires being enameled. Upon firmly clamping the wire further rotation of the capstan slightly slackens or stretches the wire so that thereafter the capstan can continue to rotate without exerting a pull on the wire.

Other objects and advantages will be apparent from the following detailed description taken in conjunction with the accompanying drawing, wherein Fig. 1 is a fragmentary sectional view of a wire coating apparatus illustrating one embodiment of the invention;

Fig. 2 is a fragmentary front elevational view of a portion of the apparatus shown in Fig. 1;

Fig. 3 is a fragmentary sectional view of wire coating apparatus illustrating another embodiment of the invention, and Fig. 4 is a fragmentary sectional view of a wire coating apparatus illustrating another embodiment of the invention.

Referring now to Figs. 1 and 2 of the drawing, reference numeral 10 designates capstans fixedly mounted upon a shaft 11 which is continuously driven by any suitable mechanism (not shown). The capstans 10 are provided with a plurality of peripheral grooves for receiving convolutions 12 of wires 13 which are to be coated. The wires 13 pass from supply reels (not shown) beneath and partially around idler pulleys 14 and then pass upwardly through tubes in an oven 15 to their respective capstans 10. The threading of each wire is continued around the pulleys 14 and the capstans 10 until the desired number of convolutions have been threaded through the apparatus. The wires, in passing around the pulleys 14, are submerged in a bath of coating material 16, carried by a receptacle 17, forming a coating for the first convolution of each wire as it passes upwardly through the oven 15, and an additional coating for each subsequent convolution of the wires as they pass through the bath 16 and upwardly through the oven 15 which is heated at a desired temperature to bake the coating material upon the wires.

The wires 13 pass from the last grooves of the capstans 10 through grooves in idler pulleys 18 to takeup reels 19 upon which the wires are distributed. The takeup reels 19 may be driven in the conventional manner through friction clutches to place a desired tension on the wire. The capstans 10 are driven in the direction of the arrow shown in Fig. 1 and at the downwardly moving sides clamping devices indicated generally at 20 are positioned to clamp all of the convolutions of each wire between the capstans and the idler pulleys 18 for the purpose of stopping the advancement of the wires when desired. The clamping devices consist of brackets 21 rigidly mounted at suitable or convenient places upon the oven 15 and having vertically extending fixed clamping portions 22 into engagement with which the convolutions of the wires may be pressed. Vertically extending portions 23 of the brackets 21 pivotally support cams 24 which normally rest in the positions shown in Fig. 1 and at the right in Fig. 2, but which may be actuated by any suitable means such as hand levers 25 to cause them to force movable clamping jaws 26 toward the convolutions of wires to move the convolutions of wires into close engagement with the fixed members 22. In the unit at the left in Fig. 2 the handle 25 is shown in its actuated position. The movable clamping members 26 are mounted upon resilient members or springs 27 which are fixedly supported at their lower ends on horizontally extending portions 28 of the brackets 21.

During the normal operation of the wire coating apparatus, the convolutions of the wires will pass freely between the clamping members 22 and 26, but in the event that it is desired to stop the advancement of one of the wires, it is possible to do this without stopping the entire apparatus. In this type of apparatus several wires may be coated simultaneously but for the purpose of illustration only two are shown. The capstans 10 are rotated continuously and with the provision of the clamping units 20 the advancement of any one of the wires may be stopped, allowing the apparatus to continue the coating of the other wires. Assume, for example, that it is desirable to stop the advancement of the wire passing around the capstan 10 at the left in Fig. 2. By swinging the lever 25 counterclockwise (Fig. 1) to the position shown in Fig. 2 the cam 24 of the clamping unit 20 shown at the left in Fig. 2, will move its respective movable clamping member 26 toward the convolutions of wire forcing them into firm engagement with the fixed portion 22 and hold them against downward movement. By clamping the convolutions of the strand at this position sufficient slack will be formed at the capstan to cause the capstan to lose its friction on the wire and continue to rotate without advancing the wire. The friction clutch of the takeup reel 19 will be ineffective to rotate the reel as long as the clamping unit 20 is closed. When it is desirable to continue the advancement of the wire, the clamping unit 20 is released by swinging the lever 25 in a clockwise direction to return the cam 24 to its normal position and allow the resilient member 27 to force the movable clamping member 26 away from the convolutions of the wire. The takeup reel will be rotated through the friction clutch as soon as the clamping unit releases the convolutions of wire, thus taking up the slack in the wire and reestablishing the traction between the convolutions of wire and the capstan.

Fig. 3 illustrates the clamping member when disposed between a positively driven capstan and the takeup reel in a type of machine in which the loops of wire pass over idler pulleys both at the top and bottom of the enameling machine and the capstan draws the wire from the final idler pulley. In this figure the convolutions of wire 13 pass upwardly through the tubes in the oven 15 and over an idler pulley 30 rotatably mounted upon a shaft 31. The wire in passing from the last groove of the pulley 30 passes over an idler pulley 32 and down and around a positively driven capstan 33. A shaft 34 upon which the capstan 33 is mounted is rotated continuously by any suitable means (not shown). The wire 13, after passing from the capstan 33, passes through the clamping unit 20 and through a groove in an idler pulley 35 to a takeup reel 36 which is driven in any suitable manner preferably through a friction clutch mechanism. The bracket 20 bears the same reference numerals as that shown in Figs. 1 and 2 in that the construction is substantially the same, and this clamping member may be mounted upon any suitable support 37. In this embodiment of the invention the wire is coated in the manner hereinbefore described in regard to Fig. 1, the only difference in operation being that the wire is advanced through the rotation of the capstan 33 and in order to stop the advancement of the wire the clamping unit 20 is closed by the actuation of the lever 25, causing the wire to become loose upon the capstan. The friction clutch for the takeup reel is constructed so as to be ineffective for rotating the takeup reel as long as the wire is held by the clamping unit. The advancement of the wire may again be brought about by opening the clamping unit 20 through the actuation of the lever 25, allowing the takeup reel to be rotated to tighten the wire upon the capstan 33, thus re-establishing the traction and continuing the advancement of the wire.

Fig. 4 illustrates another embodiment of the invention, the arrangement of which is identical to that shown in Fig. 1 with the exception of the clamping unit. The clamping unit shown in this figure consists of clamping jaws 40 pivotally mounted upon a bracket 41 which is fixed to the oven 15 or any suitable support. The shafts which constitute the pivots for the clamping jaws are fixed thereto, one of the shafts having a lever 42 fixed thereto adjacent its midpoint, the inner ends of the lever carrying a pin, while the other shaft has a link 43 fixed thereto and extending toward the lever where a slot in the link receives the pin of the lever to operatively connect the link and the lever together. In the present illustration of this embodiment the adjacent surfaces of the clamping members 40 are arcuate in shape, but these surfaces may be corrugated or made irregular for the purpose of increasing their holding effect upon the convolutions of the wire 13 when actuated. Usually, however, smooth surfaces as shown will effectively hold the convolutions of wire against advancement. To close the clamping unit shown in this figure, the lever 42 is moved counterclockwise moving with it the adjacent clamping jaw and simultaneously pulling the link 43 downwardly, causing the other clamping jaws to be moved inwardly toward the convolutions of wire, and as the clamping jaws are moved their adjacent surfaces will clamp the convolutions of wire holding them against advancement. The capstan 10 is rotated continuously and as soon as the clamping unit is closed the capstan will continue the advancement of the wire until the wire is loose thereupon after which the capstan will continue to rotate without advancing the wire. The clamping unit may be released from the wire by swinging the lever 42 clockwise to move the clamping jaws 40 into positions shown in Fig. 4 after which the wire will be drawn tight upon the capstan by a takeup reel, as shown in Fig. 1, thus reestablishing the traction and causing the wire to again be advanced.

In each of the forms of the invention shown in the drawing, manually controlled means is provided for operating clamps, but it should be understood that automatic means may be provided for actuating the clamps, for example, a mechanical means as shown in Fig. 4 of the patent to Stastney No. 1,706,754 of March 26, 1929, operated under the control of the moving strand for controlling the clutch mechanism may be adapted for actuating the clamps shown in applicant's drawing.

Electrical means including a solenoid operated under the control of the advancing strand as shown in the patent to Serrell, Jr. No. 334,618 of January 19, 1886, may be provided for actuating the clamps.

It will be understood that the nature and embodiment of the invention herein described are merely illustrative and that many changes and modifications may be made therein without departing from the spirit and scope of the invention.

What is claimed is:

1. In a strand handling apparatus, a continuously running capstan for receiving and advancing strand material, means for rotating said capstan, and clamping means for gripping the strand material and holding it against advancement on the capstan without stopping the rotation of said capstan.

2. In a strand handling apparatus, a continuously running capstan for receiving and advancing strand material, means for rotating said capstan, and clamping means for gripping the strand material after it passes from the capstan for holding the strand material against advancement without stopping the rotation of the capstan, the rotation of the capstan continuing the advancement of the strand material until it becomes loose thereupon.

3. In a strand handling apparatus, a capstan having a plurality of grooves therein for receiving and advancing a plurality of convolutions of strand material, and clamping means for gripping the convolutions of strand material simultaneously after they pass from the capstan for simultaneously stopping the advancement of the convolutions of the strand material.

4. In a strand handling apparatus, a capstan for receiving and advancing strand material, means for rotating said capstan, clamping members positioned adjacent the strand material passing from said capstan, and means for actuating one or more of said clamping members for causing the strand material to be gripped therebetween for holding the strand material against advancement during the rotation of the capstan.

5. In a wire enameling machine, means for guiding and advancing a plurality of wires each through a plurality of elongated convolutions, said means comprising a plurality of capstans mounted on a common drive shaft, means for applying enamel to said convolutions and baking it thereon, and clamping means for gripping one of said wires to stop its advancement without stopping said drive shaft.

RICHARD D. JESSUP.